United States Patent Office 3,546,477
Patented Dec. 8, 1970

3,546,477
LASER FREQUENCY CONVERSION DEVICE USING MAGNETOGAS PLASMA
Noboru Hokkyo, Sagamihara-shi, Japan, assignor to Hitachi, Ltd., Tokyo, Japan, a corporation of Japan
Filed Feb. 7, 1969, Ser. No. 797,494
Claims priority, application Japan, Feb. 28, 1968, 43/12,214
Int. Cl. H03f 7/00; H02m 5/06
U.S. Cl. 307—88.3        6 Claims

ABSTRACT OF THE DISCLOSURE

A frequency conversion device for the conversion of laser frequency in which a plurality of laser beams of different frequencies are irradiated to a gas plasma applied with a magnetic field, the frequency of the hybrid plasma oscillation of the electrons in the plasma is tuned to the difference frequency between the frequencies of the laser beams, so the above oscillation of the electrons is excited resonately by the beat wave of the laser beams, and the microwave radiation of the beat frequency is emitted from the plasma.

---

This invention relates to a frequency conversion device for a laser beam and more particularly to the generation of microwaves.

As is well known, a laser beam is widely used and developed as novel energy or signal transmission means. However, since the frequency of a laser beam is determined by the kind of active material generating the laser beam, the number of available frequencies is limited at present. In order to make use of a larger number of frequencies, various frequency conversion devices have been developed.

Among such frequency conversion devices, Raman scattering (a radiation beam of a frequency different from that of the incident beam is scattered when a laser beam is irradiated to a gaseous, liquid or solid medium) is well known. In this case, the difference between the frequency of the incident beam and that of the scattered beam is equal to the frequency of the vibration mode of the medium or to the integral multiple thereof and the frequency of the scattered beam is not so different from that of the incident beam. A kind of Raman scattering utilizing the magnetic effect has also been proposed. For example, the laser beam is irradiated to a semiconductor applied with a magnetic field and scattered through the electronic transition betwetn Landau levels, and accordingly the frequency of the scattered beam is shifted by a frequency corresponding to the energy difference between Landau levels. Further, the shaft frequency varies with the intensity of the applied magnetic field and optical frequency modulation may also be performed. In this case also, the frequency of the scattered beam is closed to that of the incident beam. In the above methods, the frequency is shifted by the vibration mode of the medium or by the difference between energy levels and it is difficult to convert the frequency drastically.

As means to convert the frequency of the laser beam more drastically, harmonic generation and optical mixing utilizing the non-linear phenomenon of dielectrics is known. Frequency conversion according to these methods is based on the non-linear polarization wave generated in the dielectrics by the incident laser beam. Among these, difference-mixing which generates the radiation having a difference frequency of a plurality of laser beams has a much lower conversion efficiency, in principle, and is difficult to realize compared with the sum-mixing or harmonic generation method. Moreover, it requires an intense incident beam and the dielectrics may be damaged.

An object of this invention is to provide a device for converting a laser beam (visible or near infrared) into a microwave.

Another object of this invention is to provide a frequency conversion device which performs said frequency conversion with high conversion efficiency and which is stable under an intense incident beam.

A further object of the invention is to provide a versatile frequency conversion device which is easy to adjust and control.

The present invention which achieves said objects is based on the fact the hybrid plasma oscillation of electrons emits microwaves in the active celestial region.

The device according to this invention is a frequency conversion device for the conversion of a laser frequency which comprises means for generating plasma in a gaseous medium; means for applying a magnetic field to said plasma to make the electrons in said plasma perform hybrid plasma oscillation; means for directing a plurality of laser beams of different frequencies into said magnetoplasma in such a manner that said beams intersect with each other at least in a position in said plasma (the difference of said frequencies being tuned to the frequency of said hybrid oscillation, said oscillation being excited resonately by the beat wave of said laser beams and the microwave radiation of the beat frequency being radiated), and means for utilizing said microwave radiation.

When an external magnetic field is applied to a plasma, the electrons in the plasma receive the effect of the magnetic field and the electric field due to the space charge and perform the hybrid plasma oscillation with an angular frequency $$\omega = \sqrt{\omega_p^2 + \omega_c^2}$$

Here, $\omega_p = 5.6 \times 10^4 \sqrt{n}$ radian/sec.
$\omega_c = 1.76 \times 10^7 H$ radian/sec.
$n$: electron density in plasma per cm.$^3$
$H$: applied magnetic field intensity (gauss).

As, in the usual state, $n$ is at most of the order of $10^{14}$ cm.$^{-3}$ and $H$ is of the order of $10^3$ gauss, $\omega$ lies in the microwave region. When two laser beams whose frequencies $\omega$ are different by said frequency $\omega$ are irradiated simultaneously to the magnetoplasma, the laser beams are absorbed resonately by the electron hybrid plasma oscillation and said oscillation is excited. The excited hybrid oscillation emits a microwave frequency radiation.

According to this invention, since the hybrid plasma oscillation excited resonately by the laser beat emits microwaves, high conversion efficiency is achieved. For example, when a laser beam is irradiated to a non-magnetogasplasma to obtain a scattered wave undergoing Raman scattering due to plasma oscillation, a large input laser power of $10^7$ mw./cm.$^2$ is necessary (G. G. Comisar, Physical Review, vol. 141, p. 200, 1966), while, according to the present invention, a microwave output of 1 w./cm.$^2$ may be obtained by a laser beam of 3 mw./cm.$^2$. Such an input power is easily obtained by conventional laser technique.

Other objects, features and advantages of the invention will become more apparent from the following detailed description of preferred embodiments of the invention when taken in conjunction with the accompanying drawings, in which.

Figure 1:
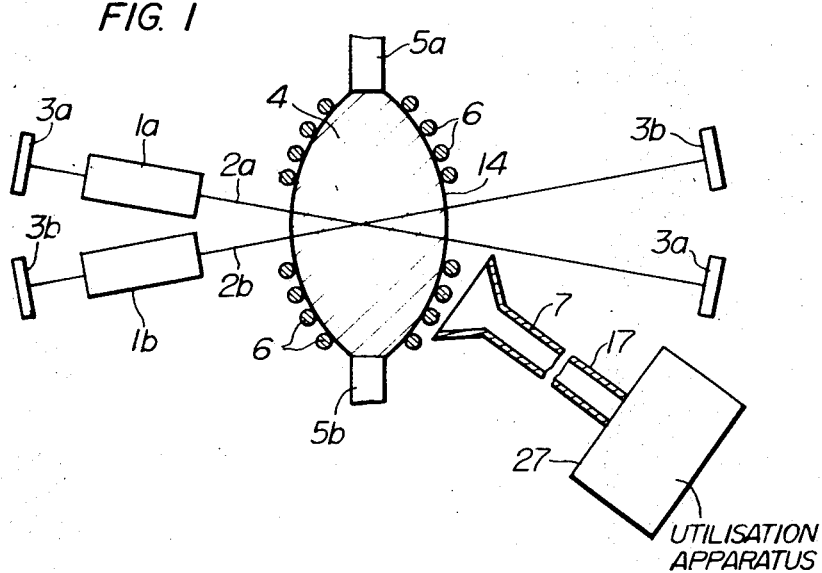
FIG. 1 is a schematic sectional diagram of an emboiment of the invention.

Referring to FIG. 1, 1a and 1b indicate laser light sources generating laser beams of different frequencies. The paths of the laser beams emitted from 1a and 1b are shown by 2a and 2b. The reflecting mirrors 3a and 3b composing a laser resonator are provided across the paths 2a and 2b. The gaseous medium contained in the case 14 transparent to a laser beam and a microwave generates the plasma 4 due to the electric discharge between the electrodes 5a and 5b. The beam paths are placed so that they cross in the plasma 4. The solenoid coil 6 is provided around the case 14 and the current through the coil 6 generates a magnetic field in the plasma 4. The electron density in the plasma 4 is controlled by the discharge conditions such as gas pressure, discharge voltage, etc. and the intensity of the magnetic field is controlled by the solenoid current. The horn collector 7 which catches the microwave emitted from the plasma 4 is near the plasma 4.

By adjusting said discharge conditions and/or the solenoid current, the frequency of the hybrid oscillation of the electrons in the plasma is tuned to the difference frequency of the frequencies of the incident laser beams. The frequency of the beat generated at the region of intersection of the two beams resonates with the hybrid plasma oscillation resonately excites said oscillation and a large amount of microwave radiation is emitted. Generally in a gas plasma, the central part has high plasma density and the periphery has low density. Thus, the microwave radiation generated at the center is emitted outside efficiently with little absorption. The emitted microwave is collected by the horn collector 7 and led through the waveguide 17 to the utilization apparatus 27. When 1a and/or 1b of said embodiment are tunable semiconductor lasers comprising an internal modulator or when a frequency modulator is provided on 2a and/or 2b, a variable beat frequency is obtained.

Further, an embodiment comprising one laser light source can be composed as will be described hereinbelow.

The laser beam emitted from one laser light source is split into two beams with a beam splitter such as a half mirror, a prism, etc. One of the split beams is projected directly to the magnetoplasma and the other is projected to the scattering medium. The scattered beam whose frequency is shifted by stimulated Raman scattering, stimulated Brillouine scattering, etc. is projected to the magnetoplasma. The frequency of the hybrid oscillation of the electron is tuned to the shift frequency and microwaves having a frequency equal to the shift freqency are emitted. In said embodiments, the laser beams intersect in the magnetoplasma and a laser beat is generated.

There is realized a further embodiment, in which the paths of two laser beams intersect and coincide outside the magnetoplasma and the beat waves travel to the magnetoplasma and propagate therethrough. Also in this case, the frequency of the hybrid plasma oscillation is tuned to the beat frequency and microwave radiation is emitted from the magnetoplasma as in the former cases.

Figure 2:
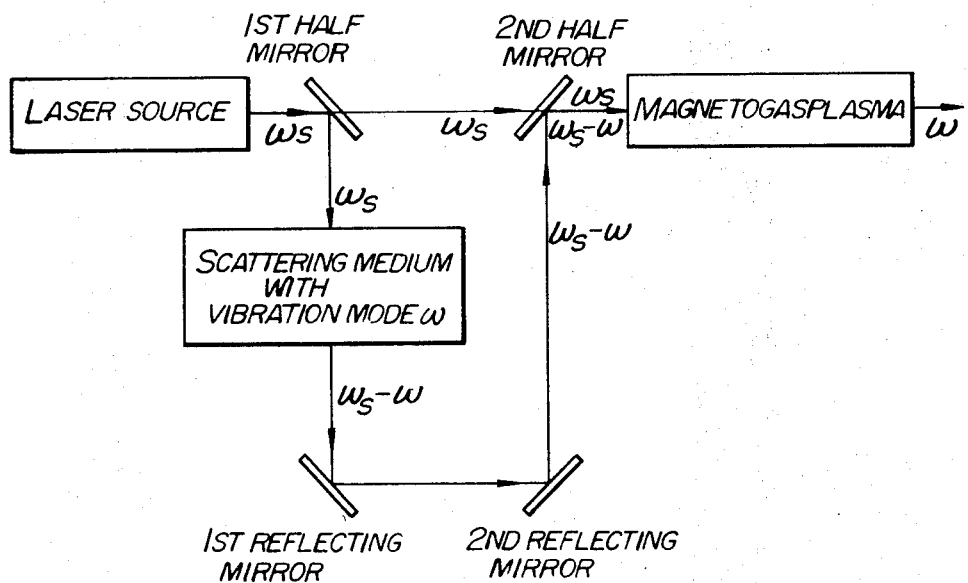
FIG. 2 is a block diagram of another embodiment of the invention.

Referring to FIG. 2, the block diagram of an embodiment in which the beat wave is projected to the magnetoplasma is shown. The laser beam of an angular frequency $\omega_s$ emitted from the laser source is split into two beams by the first half mirror. One of the beams propagates through the first and second half mirrors. The other beam reflected by the first half mirror is irradiated to the scattering medium of an oscillation mode $\omega$. The scattered beam of a frequency $\omega_s - \omega$ is reflected and deflected by the first and second reflecting mirrors and the second half mirror and meets the beam of a frequency $\omega_s$ which has passed through the first and second half mirrors. The total beam generates a beat wave of $\omega$ and is projected to the magnetoplasma. When the angular frequency of hybrid plasma oscillation of the electrons in the plasma is tuned to $\omega$, microwave radiation of an angular frequency $\omega$ is emitted as in the above embodiments.

Several embodiments of this invention have been described hereinabove. The purport of this invention is summarized as follows: when the beat frequency of a plurality of laser beams is tuned to the hybrid oscillation of the electrons in the magnetoplasma, the energy of the laser beam is absorbed resonately by the hybrid plasma oscillation and said resonately excited oscillation emits microwave radiation. Accordingly, this invention has the following advantages. Firstly, the frequency of the output radiation is equal to that of the hybrid oscillation of the electrons in the magnetoplasma and lies usually in a microwave region. Namely, visible or near infrared laser beams are converted into microwaves. Secondly, since the laser beam is absorbed resonately by the hybrid oscillation of the electrons in the plasma according to this invention, high conversion efficiency is obtained. As described above, this invention can be performed with a much lower laser power compared with the device in which a laser beam is irradiated to the non-magnetoplasma and the scattered beam is obtained by Raman scattering through plasma oscillation. Thus, this invention can be performed by present-day laser technique. Further, since gas plasma usually has high plasma density at the center and low density at the periphery, the intense microwave generated at the center is emitted efficiently outside with little absorption by the plasma at the periphery. This invention is preferable, in this respect, to the solid-state plasma having substantially uniform density. Thirdly, since gas plasma is used as the conversion medium, heat damage occurring in the prior art using solid dielectrics does not occur and high microwave radiation is obtained by using intense laser beams. Fourthly, since the frequency of the hybrid plasma oscillation of the electrons which perform conversion is easily controlled by the discharge conditions and the exciting current, this invention provides a versatile conversion device easy to adjust and handle.

Though several preferred emobidments have been described hereinabove, it will be evident to those skilled in the art that various modifications and changes may be made without departing from the spirit of this invention.

What is claimed is:

1. A frequency conversion device for the conversion of laser frequency comprising means for generating plasma in a gaseous medium; means for applying a magnetic field to said plasma to put the electrons in hybrid plasma oscillation; means for directing a plurality of laser beams of different frequencies into said plasma in such a manner that said beams intersect with each other at least in a position in said plasma, the difference between said frequencies being tuned to the frequency of said hybrid oscillation, whereby said oscillation is excited resonately by the beat frequency of said beams, the microwave radiation of said beat frequency is emitted from said plasma; and means for utilizing said microwave radiation.

2. A frequency conversion device according to claim 1, wherein at least one of said laser beams is emitted from the tunable laser source, whereby the frequency of said microwave radiation is variable.

3. A frequency conversion device according to claim 1, wherein the frequency modulator is provided on the optical path of said laser beams, whereby the frequency of said microwave radiation is variable.

4. A frequency conversion device according to claim 1, wherein said laser beams are directed into said plasma at an angle to each other so that said beams intersect and generate the beat wave within said plasma.

5. A frequency conversion device according to claim 1, wherein said laser beams intersect and coincide at a position outside said plasma, a beat wave propagates to and within said plasma.

6. A frequency conversion according to claim 1, wherein said laser beams are emitted from a laser source and split by a beam splitter, at least one of said split beams being frequency shifted.

No references cited.

ROY LAKE, Primary Examiner

D. R. HOSTETTER, Assistant Examiner

U.S. Cl. X.R.

321—69